United States Patent [19]
Sohm

[11] Patent Number: 5,385,362
[45] Date of Patent: Jan. 31, 1995

[54] LOCKING MECHANISM FOR PONTOON BOAT TRAILER

[76] Inventor: Malcolm Sohm, 1243 Conrad St., Oshkosh, Wis. 54904

[21] Appl. No.: 788,920

[22] Filed: Nov. 7, 1991

[51] Int. Cl.$^6$ ............................................. B60P 3/10
[52] U.S. Cl. ............................................. 280/414.1
[58] Field of Search ............... 280/414.1, 414.2, 414.3; 114/344, 230, 61; 296/35.1, 35.3; 414/495, 531

[56] References Cited

U.S. PATENT DOCUMENTS

| | | | |
|---|---|---|---|
| 3,879,781 | 4/1975 | Roschynialski | 114/344 |
| 4,023,222 | 5/1977 | Selby | 414/531 |
| 4,114,772 | 9/1978 | Beelow | 414/495 |
| 4,273,351 | 6/1981 | Salamander | 280/414.1 |
| 4,395,185 | 7/1983 | Whaley | 114/344 |
| 4,422,665 | 12/1983 | Hinnant | 280/414.2 |
| 4,637,770 | 1/1987 | Swadell | 280/414.3 |
| 4,702,510 | 10/1987 | Davis | 296/35.3 |
| 4,801,153 | 1/1989 | Wilson | 280/414.1 |
| 5,114,168 | 5/1992 | Kehl | 114/344 |

*Primary Examiner*—Brian L. Johnson
*Assistant Examiner*—Kevin Harley
*Attorney, Agent, or Firm*—Henderson & Sturm

[57] ABSTRACT

A pontoon boat trailer having a wheeled main frame with a tongue and hitch unit at a front end, a subframe pivotally mounted on the main frame for supporting a pontoon boat, the subframe having an upstanding boat stop unit at the front end, and a winch assembly operably connected between the tongue and hitch unit and the front end of the subframe for pivotally raising and lowering the subframe, the improvement comprising a bracket unit mounted on the front end of the boat adapted for releasable locking engagement with the boat stop unit by utilizing the buoyancy of the boat.

5 Claims, 4 Drawing Sheets

LOCKING MECHANISM FOR PONTOON BOAT TRAILER

TECHNICAL FIELD

The present invention relates generally to boat carrying trailers, and more particularly to those of the type used specifically for transporting pontoon boats, having a main frame mounted on a wheel and axle unit, and with a tongue and hitch unit at the front, and a subframe pivotally mounted on the main frame for supporting the pontoon boat, and a winch assembly for raising and lowering the subframe relative to the main frame for launching and retrieval of the pontoon boat.

BACKGROUND ART

With an ever increasing number of different sized and shaped pontoon boats, contemporary trailers are continually trying to develop means for maintaining the pontoon boat on the trailer in a locked stationary transport position while still enabling but one person, the operator for example, to both launch and retrieve the boat relative to the trailer.

One type of trailer has stops mounted at the front of the subframe for locating the boat on the trailer during transportation; however, as the pontoon boat and subframe as a unit are raised by the winch assembly to a transport position, in many instances slippage therebetween occurs, resulting in an improper loaded position of the pontoon boat on the trailer with and causing resultant potential transportation problems.

Various attempts have been made to solve this problem, such as pivoting latches, retainer devices and other complicated latching and locking structures; however, none have solved the problem to the extent of the present arrangement.

DISCLOSURE OF THE INVENTION

The present invention is complementary to the type of trailer described hereinbefore and utilizing one or a pair of upstanding boat stops mounted in transversely spaced relation on the front of the subframe. In like transversely spaced relation as to distance between the stops, and on the front of the pontoon boat so as to be both laterally and vertically alignable with the stops, a pair of brackets are secured to the front of the pontoon boat such that one person can easily and quickly maneuver the trailer and boat, using the buoyancy of the boat to either disengage or engage the respective boat stops and brackets by vertical movement of each relative to the other.

A comprehension of the invention shows the simplicity and economics of it in that, for launching the boat actually floats off the engaged relation of the boat brackets embracing the trailer stops, particularly with a continued lowering of the subframe downwardly and away from the floating boat; and for retrieving the boat from the water by the trailer, again one person may raise the subframe to a position where the trailer stops are slightly in front of and of a height equal at least to the height of the floating boat brackets, whereby the operator may then use the buoyancy of the boat to literally raise the front end of the boat to position the brackets over the stops a sufficient, albeit short period of time, such that the brackets then move downwardly to embrace the stops. Further raising of the subframe by the winch assembly completes the loading of the boat onto the trailer and the locking engagement of the boat to the trailer for safe transport.

It is an object of this invention to provide a new and novel releasable mechanism for locking a trailer and pontoon boat together for transport.

It is another object of this invention to provide an improved locking mechanism utilizing the buoyancy of the boat for floating the boat relative to the trailer into and out of a locking relationship.

Yet another object of this invention is to provide such an improved mechanism having no moving parts, providing a self-locking mechanism.

BRIEF DESCRIPTION OF THE DRAWINGS

These and other attributes of the invention will become more clear upon a thorough study of the following description of the best mode for carrying out the invention particularly when reviewed in conjunction with the drawings, wherein.

BEST MODE FOR CARRYING OUT THE INVENTION

Figure 1:
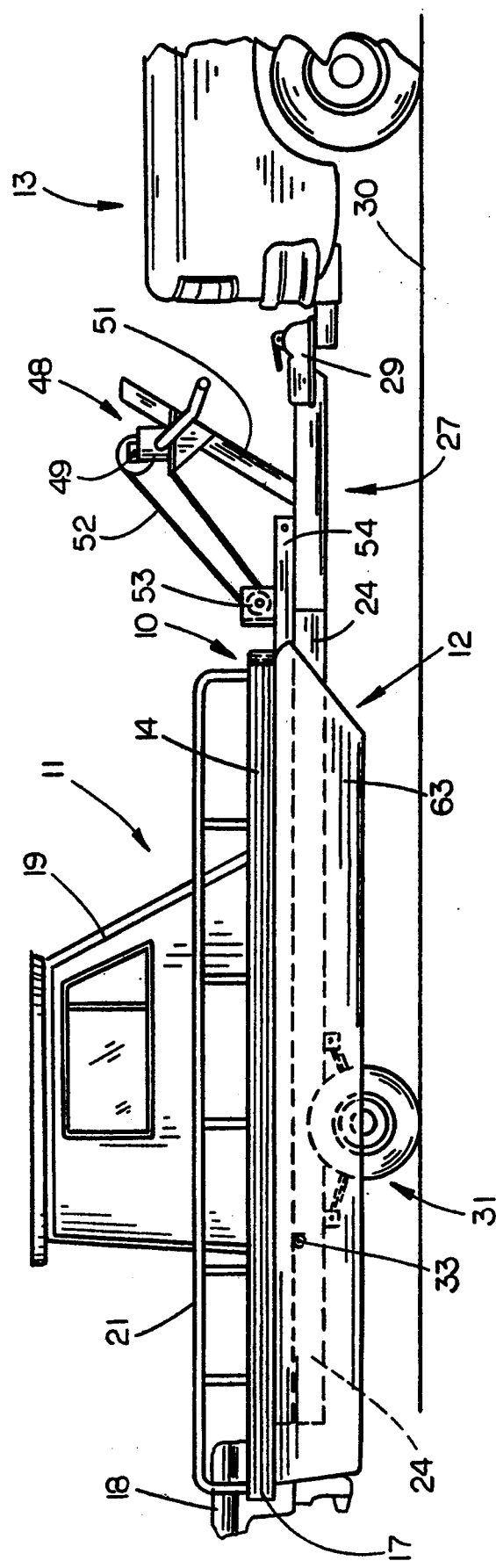
FIG. 1 is a side elevational view of this invention in locked condition for transporting a pontoon boat or a trailer pulled by a prime mover.

Referring now to the drawings, the locking mechanism of this invention is indicated generally at (10) in FIG. 1 in complementary relation with a pontoon boat (11) and a wheeled trailer (12) towed by a prime mover (13).

Figure 4:
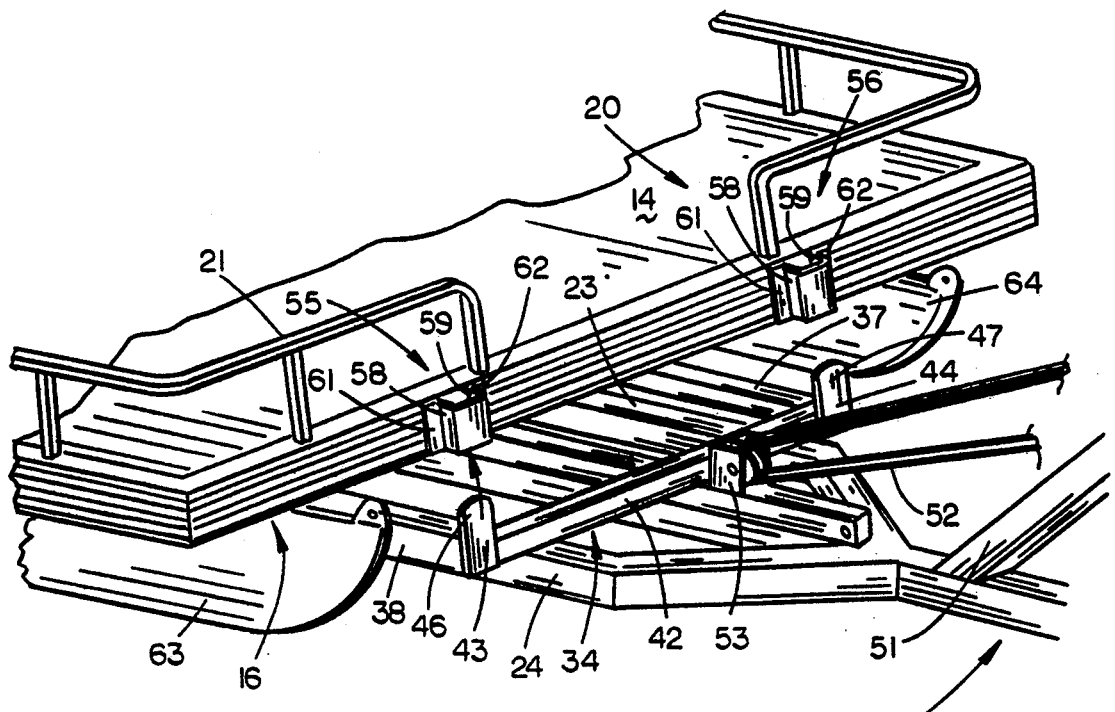
FIG. 4 is an enlarged, fragmentary perspective view of the invention in a non-engaged relationship

The pontoon boat (11) includes a platform (14) having a front end (16), a rear end (17) on which a motor (18) is mounted, and a cabin (19) supported on the platform (14). A railing (21) extends around the perimeter of the platform (14), leaving a walk-through opening indicated generally at (20) (FIG. 4).

Figure 3:
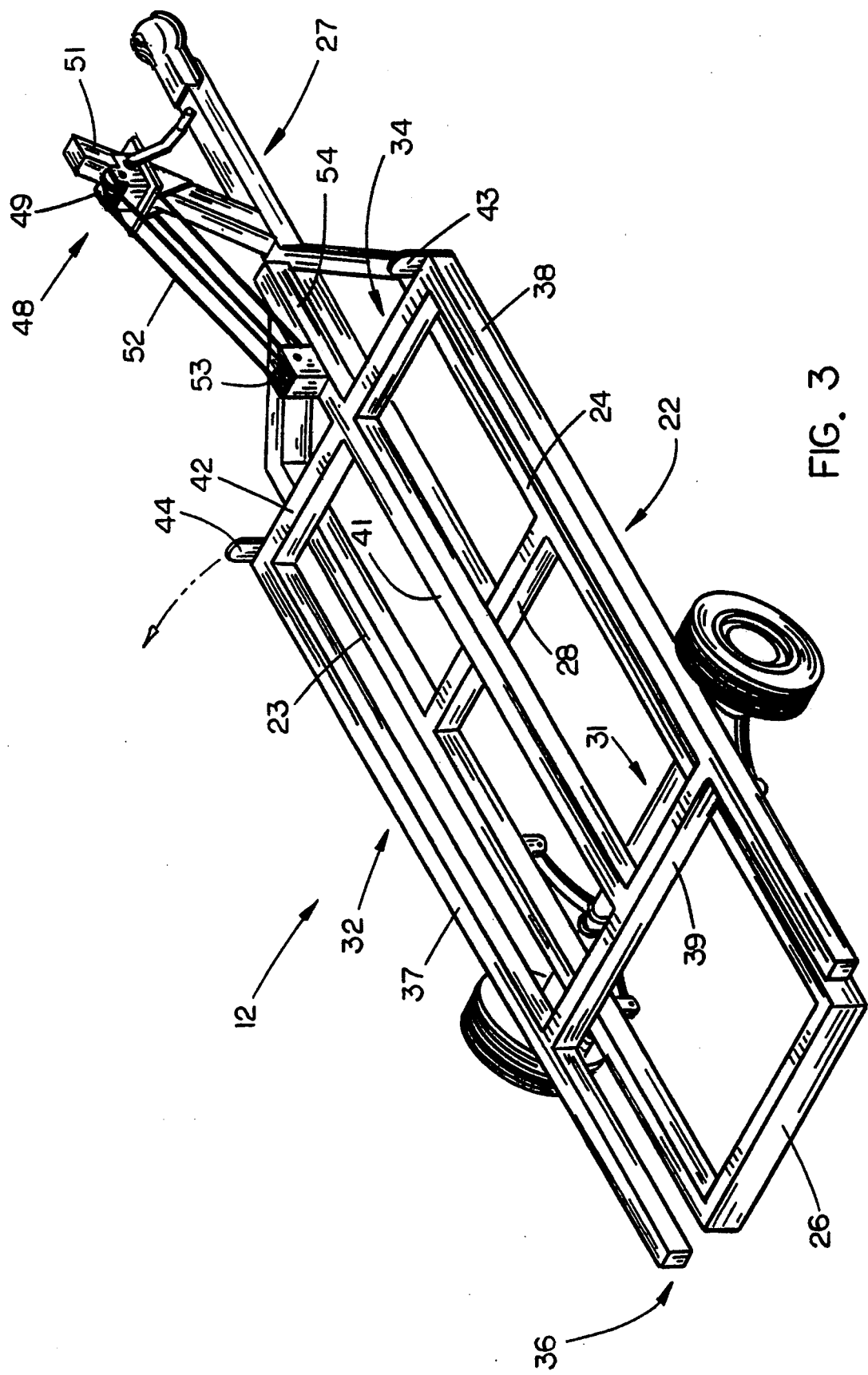
FIG. 3 is a perspective view of the boat trailer of this invention.

Referring to FIG. 3, the trailer (12) comprises a main frame (22) having side members (23), (24), a rear end (26), a tongue unit (27) at the front extended forwardly from a crossmember (28) and having a hitch (29) for attachment to the prime mover (13). The main frame (22) is mounted on a wheel and axle unit (31) for movement over the ground (30).

The trailer (12) comprises further a subframe (32) (FIGS. 3 and 4) pivotally mounted at (33) on the main frame (22) for movement from a position level therewith (FIG. 1) to a position where the front (34) (FIG. 2) is raised above the main frame (22) with the rear (36) lowered to provide for the boat (11) sliding into the water (not shown) when the trailer (12) is backed into it, or to provide for pulling the boat up out of the water and, normally, up a ramp to a level ground condition. The subframe (32) has a pair of side elements (37), (38) with a cross member (39) having a central member (41) extended between the side elements (37), (38) and through a front element (42). A pair of upstanding stops (43), (44) (FIGS. 3 and 4) are mounted in transversely spaced relation to the front element (42), it being noted that the upper ends (46), (47), respectively, of the stops (43), (44) protrude above the upper surfaces of the subframe (32) at the front (34) thereof.

To raise and lower the front (34) of the subframe (32) relative to the main frame (22), a winch assembly (48) comprises a drive pulley unit (49) mounted on a post (51) connected to the tongue unit (27), and interconnected by cables (52) to a driven pulley unit (53) mounted on an extension (54) (FIG. 3) of the central member (41).

Figure 5:
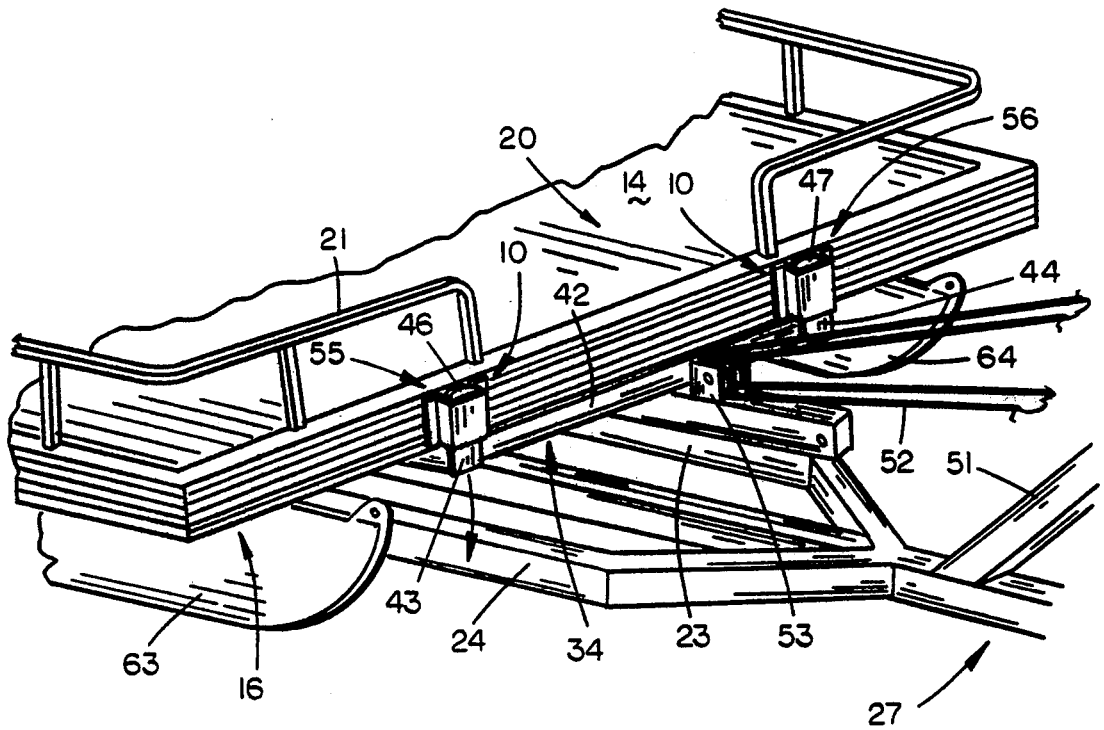
FIG. 5 is a view similar to FIG. 4 and where the invention is shown in an engaged relationship.

Secured to the front end (16) of the platform (14), and cooperating with the stops (43), (44) as part of the invention are a pair of transversely spaced U-shaped brackets (55), (56) (FIGS. 4 and 5). The brackets (55), (56) are identical and each comprises a face plate (57), a pair of transversely spaced side plates (58), (59); and a pair of flanges (61), (62) extended substantially normal to the side plates (58) (59), and when affixed in any manner to the platform front end (16), the brackets (55), (56) forming an enclosure open at both the top and bottom. It will be noted that the lateral spacing between the brackets (55), (56) is the same as the lateral spacing between the subframe stops (43), (44).

It will be noted further that the spacing between each pair of flanges (61), (62) for each bracket (55), (56) is sufficient such that upon vertical movement of each vertically aligned pair of bracket stop (55), (43) and (56), (44) (FIGS. 4 and 5), the enclosure formed by each respective bracket receives and embraces a respective stop such as to form a locking arrangement preventing longitudinal relative movement between the boat (11) and the trailer (12). The locking arrangement of the invention (10) is releasable only by relative vertical movement of the boat (11) and trailer (12) away from each other.

Figure 2:
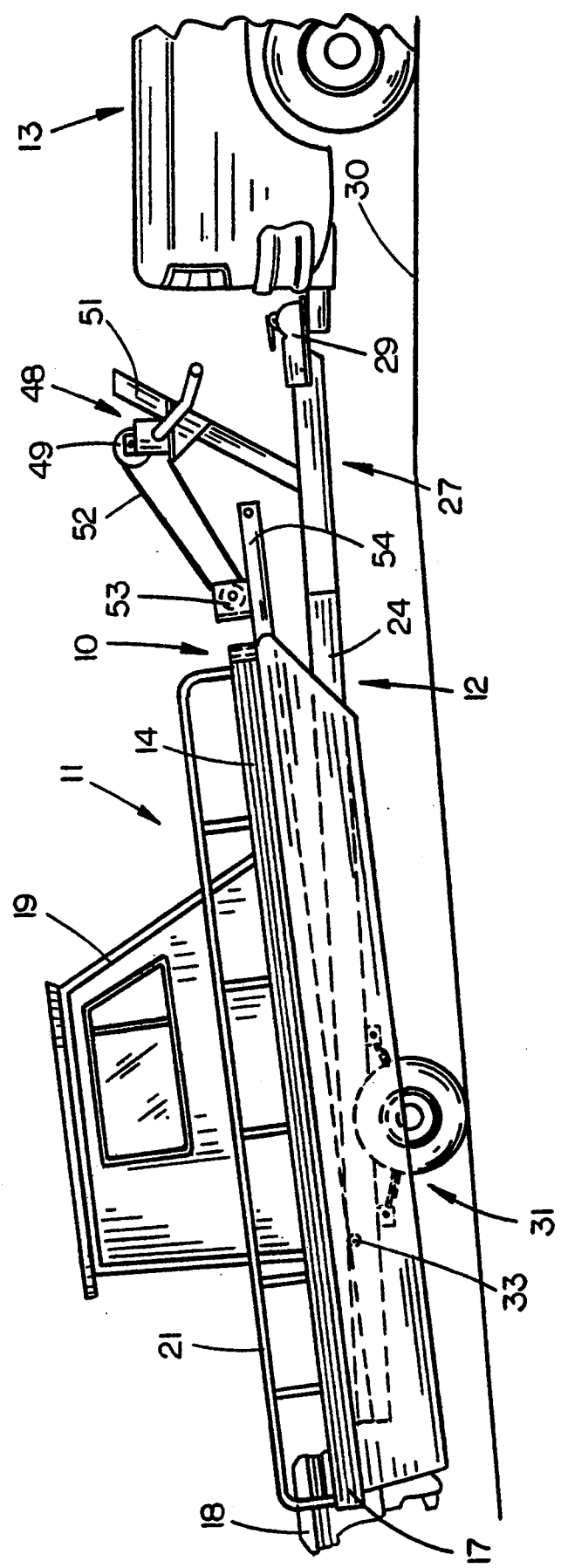
FIG. 2 is a view similar to FIG. 1, and showing the front end of the subframe of the trailer in a raised position prior to either backing the unit into water for launching the boat, or to pulling the boat out of the water.

In normal operation, the stops (43), (44) are engaged by the brackets (55), (56) as shown in FIG. 5, and wherein the boat (11) may be moved on the trailer (12), with the locking mechanisms (10) engaged, in either the FIG. 1 or the FIG. 2 position of the trailer (12) according to the circumstances.

To launch the boat, the operator driving the vehicular prime mover (13) backs the trailer (12) normally down a ramp and into the water until the rear end of the pontoons (63), (64) are in the water. The winch assembly (48) is then operated by the operator to lower the front (34) of the subframe (32) such that the boat (11) gains buoyancy and begins to float, but with the locking mechanisms (10) still engaged sufficiently to prevent the boat (11) from floating off the subframe (32).

The operator then ties the boat (11) to an adjacent dock, if available, and subsequently actuates the winch assembly (48) to complete the lowering of the subframe front end (34) toward a FIG. 1 condition, such that the boat (11) literally floats off and free of the locking engagement between the brackets (55), (56) and the stops (43), (44). This occurred due to a vertical lowering movement of the stops (43, (44) relative to the stationary brackets (55), (56) of the floating boat (11). The operator may the pull away the trailer (12) from beneath the boat (11) to a parked position, untie the boat (11) from the dock, and use the boat (11) as he/she desires.

To retrieve or to load the boat (11) onto the trailer (12), with the boat (11) held adjacent the dock, the trailer (12) in the FIG. 1 condition is backed into the water and beneath the boat (11). As the situation demands, the winch assembly (48) may be operated to slightly raise the subframe front (34), and in any event, the operator may then maneuver the boat (11), using its buoyancy, forwardly and up onto the trailer (12) until the stops (43), (44) are closely adjacent the brackets (55), (56). Again using the buoyancy of the boat (11), the operator can then maneuver the boat (11) in the water to cause it to raise the brackets (55), (56) above the stops (43), (44) (FIG. 4) sufficiently, such that as the boat (11) then moves downwardly in the water, the brackets (55), (56) receive and embrace the stops (43), (44). Operation of the winch assembly (48) to raise the subframe front (34) effects a full locking engagement of the mechanisms (10) such that the pontoon boat (11) and trailer (12) may be pulled out of the water as a unit.

It should be appreciated that were the boat (11) in the water, such that the water was perfectly calm and with no wind, whereby the boat was stationary in the water, the operator could position the boat (11) with the brackets (55), (56) directly over the stops (43), (44), and whereupon upward movement of the stops (43), (44) by raising the subframe (32) would automatically result in a full engagement of each locking mechanism (10).

Thus, by the provision of the locking mechanisms (10), a single operator may quickly unload and launch a pontoon boat from a trailer, and may quickly load the pontoon boat onto the trailer for safe and secure transportation, all with a minimum effort on the part of the operator.

I claim:

1. In a pontoon boat trailer having a wheeled main frame with a tongue and hitch unit at a front end thereof, a subframe pivotally mounted on the main frame for supporting a pontoon boat, a pontoon boat having a front end, a winch assembly operably connected between the tongue and hitch unit and the subframe at a front end thereof; the improvement comprising a stop unit mounted on the subframe front end, and bracket means for mounting on the front end of the pontoon boat for releasable locking engagement with the stop unit for preventing longitudinal movement of the pontoon boat while supported on the subframe.

2. The improvement of claim 1, and further wherein the stop unit and said bracket means are releasably disengaged from their locking engagement by vertical movement therebetween.

3. The improvement of claim 2, and further wherein said bracket means comprises a pair of U-shaped brackets for mounting in transversely spaced relation on the pontoon boat front end.

4. The improvement of claim 3, and further wherein each of said U-shaped brackets forms an enclosure open at the bottom thereof and adapted to receive a stop unit within said enclosure.

5. The improvement of claim 4, and further wherein each said enclosure is hand movable to a position above a stop unit, whereby vertical, relative movement between a stop unit and a said enclosure results in a said enclosure embracing a stop unit.

* * * * *